US012209710B2

(12) United States Patent
Spinka et al.

(10) Patent No.: US 12,209,710 B2
(45) Date of Patent: Jan. 28, 2025

(54) CRYOGENIC FLUID DISPENSING SYSTEM WITH HEAT MANAGEMENT

(71) Applicant: Chart Inc., Ball Ground, GA (US)

(72) Inventors: Martin Spinka, Decin (CZ); Jan Kubica, Liberec (CZ)

(73) Assignee: Chart Inc., Ball Ground, GA (US)

(*) Notice: Subject to any disclaimer, the term of this patent is extended or adjusted under 35 U.S.C. 154(b) by 584 days.

(21) Appl. No.: 17/338,816

(22) Filed: Jun. 4, 2021

(65) Prior Publication Data

US 2021/0381651 A1 Dec. 9, 2021

Related U.S. Application Data

(60) Provisional application No. 63/036,560, filed on Jun. 9, 2020.

(51) Int. Cl.
*F17C 9/00* (2006.01)

(52) U.S. Cl.
CPC ........ *F17C 9/00* (2013.01); *F17C 2201/0109* (2013.01); *F17C 2201/035* (2013.01); *F17C 2205/0323* (2013.01); *F17C 2205/0352* (2013.01); *F17C 2221/033* (2013.01); *F17C 2223/0161* (2013.01); *F17C 2227/0135* (2013.01); *F17C 2227/0302* (2013.01)

(58) Field of Classification Search
None
See application file for complete search history.

(56) References Cited

U.S. PATENT DOCUMENTS

| | | | | |
|---|---|---|---|---|
| 5,360,139 | A * | 11/1994 | Goode | F17C 5/007 222/64 |
| 5,365,981 | A | 11/1994 | Peschka et al. | |
| 5,537,828 | A * | 7/1996 | Borcuch | F17C 7/02 62/50.1 |
| 5,682,750 | A | 11/1997 | Preston et al. | |
| 5,685,159 | A | 11/1997 | Kooy et al. | |
| 5,771,946 | A | 6/1998 | Kooy et al. | |
| 6,354,088 | B1 * | 3/2002 | Emmer | F17C 13/025 141/82 |
| 6,631,615 | B2 | 10/2003 | Drube et al. | |
| 6,640,554 | B2 | 11/2003 | Emmer et al. | |
| 6,904,758 | B2 * | 6/2005 | Hall | F17C 6/00 62/53.2 |
| 7,036,322 | B2 * | 5/2006 | Noble | F17C 1/00 220/560.04 |
| 7,131,278 | B2 | 11/2006 | Svensson et al. | |

(Continued)

FOREIGN PATENT DOCUMENTS

| | | | |
|---|---|---|---|
| FR | 3017184 | A1 | 8/2015 |
| WO | WO2014/176249 | A2 | 10/2014 |

OTHER PUBLICATIONS

Extended European Search Report for European Application No. 21177982.2 Dated Nov. 8, 2021.

(Continued)

*Primary Examiner* — Filip Zec
(74) *Attorney, Agent, or Firm* — Cook Alex Ltd.

(57) ABSTRACT

A cryogenic fluid dispensing system having a tank that holds cryogenic liquid and manages heat within the system is disclosed. The cryogenic liquid dispensing system optionally includes a basin and/or a heat exchanger within the tank for managing heat within the system.

15 Claims, 4 Drawing Sheets

(56) References Cited

U.S. PATENT DOCUMENTS

| | | | | |
|---|---|---|---|---|
| 8,910,487 | B2 * | 12/2014 | Hylands | F17C 13/084 62/50.7 |
| 9,188,069 | B2 * | 11/2015 | Steffen | F02D 19/0694 |
| 9,234,452 | B2 * | 1/2016 | Stockner | F02B 45/10 |
| 9,234,627 | B2 * | 1/2016 | Cajiga | F17C 1/14 |
| 9,279,420 | B2 * | 3/2016 | Moore | F04B 39/0022 |
| 9,752,727 | B2 * | 9/2017 | Drube | F17C 7/02 |
| 9,784,411 | B2 * | 10/2017 | Diggins | F17C 5/06 |
| 9,982,669 | B2 * | 5/2018 | Desiderio | F04B 49/20 |
| 10,955,089 | B2 * | 3/2021 | Oury | F17C 9/00 |
| 2005/0132719 | A1 | 6/2005 | Svensson et al. | |
| 2014/0311591 | A1 | 10/2014 | Drube | |
| 2015/0143821 | A1 | 5/2015 | Johnson et al. | |
| 2019/0331298 | A1 | 10/2019 | Thor et al. | |

OTHER PUBLICATIONS

Eurasian Patent Search Report, (with English-language translation) for Eurasian Application No. 202191314 (Jun. 30, 2023) (6 pages).

* cited by examiner

CRYOGENIC FLUID DISPENSING SYSTEM WITH HEAT MANAGEMENT

CLAIM OF PRIORITY

This application claims the benefit of U.S. Provisional Application No. 63/036,560, filed Jun. 9, 2020, the contents of which are hereby incorporated by reference.

FIELD OF THE INVENTION

The present disclosure relates generally to cryogenic fluid dispensing systems and, in particular, to a cryogenic fluid dispensing system with the ability to manage heat in the system.

BACKGROUND

Cryogenic fluids, that is, fluids having a boiling point generally below −150° C. at atmospheric pressure, are used in a variety of applications, such as mobile and industrial applications. Cryogenic fluids typically are stored as liquids to reduce volume and thus permit containers of more practical and economical design to be used. The liquids are often stored in double-walled bulk tanks or containers with a vacuum between the walls of inner and outer vessels as insulation to reduce heat transfer from the ambient environment into the cryogenic liquid.

Dispensing of the cryogenic fluids, such as liquefied natural gas (LNG), typically is requested intermittently, for example, when an LNG fueled vehicle comes to an LNG fueling station to refuel.

Heat management is one of the most important factors in operability of liquefied natural gas (LNG) dispensing systems, such as fuelling stations. During use of the system, thermal energy heats up the tank contents and generates boil-off gas (BOG). The BOG from LNG should not be vented, as methane is considered bad for the environment, and must be handled within the system. The BOG can be accumulated in the cryogenic tank, but the accumulation pressure capacity is often insufficient, and some external means of the BOG handling is required. BOG can be recondensed using liquid nitrogen, or possibly compressed into high pressure cylinders as compressed natural gas (CNG). Both options for BOG handling add complexity and cost to dispensing systems.

SUMMARY

The example embodiments disclosed herein provide an advantageous cryogenic liquid dispensing system that overcomes disadvantages of the prior art dispensing systems. The disclosed cryogenic liquid dispensing system is able to better manage the heat build-up within the system and utilize the warmer LNG rather than cooling the system.

In one aspect, a cryogenic fluid dispensing system includes a tank defining an area that holds cryogenic liquid, a basin defining an area that is configured to hold cryogenic liquid at a height above a bottom portion of the tank and in fluid communication with the tank, and a pump. The system further includes a first supply line in liquid communication with the bottom portion of the tank that is configured to selectively direct cryogenic liquid from the tank to the pump, a conditioning heat exchanger configured to warm cryogenic liquid, a dispensing line in liquid communication with the pump and configured to direct cryogenic liquid from the pump to an inlet of the conditioning heat exchanger, a product line configured to direct liquid from an outlet of the conditioning heat exchanger to a use device, a recycle line configured to direct fluid from an outlet of the conditioning heat exchanger or the product line to the basin, a recycle valve in fluid communication with the recycle line, and a second supply line in liquid communication with a bottom portion of the basin and configured to selectively direct liquid from the basin to the pump.

In a further aspect, a cryogenic fluid dispensing system includes a tank defining an area that holds cryogenic liquid, a pump, and a conditioning heat exchanger configured to warm cryogenic liquid. The system further includes a dispensing line in liquid communication with the pump and the conditioning heat exchanger, the dispensing line passing through a top portion of the tank. The system also includes a tank heat exchanger located on the dispensing line within the top portion of the tank, a product line configured to direct liquid to a use device, a recycle line configured to selectively direct fluid from an outlet of the conditioning heat exchanger or the product line to the tank and a recycle valve in fluid communication with the recycle line.

In still a further aspect, a process is provided wherein heat in a cryogenic fluid dispensing system is controlled including the steps of storing cryogenic liquid in a tank; pumping cryogenic liquid to a conditioning system; dispensing conditioned cryogenic fluid from the conditioning system through a product line to a use device; recycling fluid from the conditioning system or the product line to a basin positioned within a headspace of the tank so that vapor in the headspace is condensed.

It is to be understood that both the foregoing general description and the following detailed description are exemplary and provided for the purposes of explanation only and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred example embodiments, references are made to the accompanying drawing figures wherein like parts have like reference numerals, and wherein.

It should be understood that the drawings are not to scale. While some mechanical details of example dispensing systems and alternative configurations have not been included, such details are considered well within the comprehension of those of skill in the art in light of the present disclosure. It also should be understood that the present invention is not limited to the embodiments shown.

DETAILED DESCRIPTION OF EMBODIMENTS

Some ingress of heat or thermal energy into a dispensing system cannot be prevented, even though insulation is used.

There are several operations associated with LNG dispensing systems, such as use as fuelling stations, that accumulate additional heat into the system. If the use vehicle tank pressure is too high, the pressure is vented to the tank of the system, which will increase the temperature of fluid within the tank. Temperature may also be increased during dispensing system cool-down, wherein liquid natural gas is circulated by a pump back to the storage tank until the LNG parameters are suitable for the vehicle tank. Also, the dispensing system may contain warmed fluid after dispensing is complete, such as in a conditioning heat exchanger and/or a product line running from the conditioning heat exchanger outlet to a dispensing outlet, which is sent back to the tank. The disclosed embodiments include systems designed to better manage heat in the dispensing system. While the embodiments are described as LNG refuelling stations, the technology of the disclosure may be applied to alternative types of dispensing systems containing alternative types of fluids.

Figure 1:
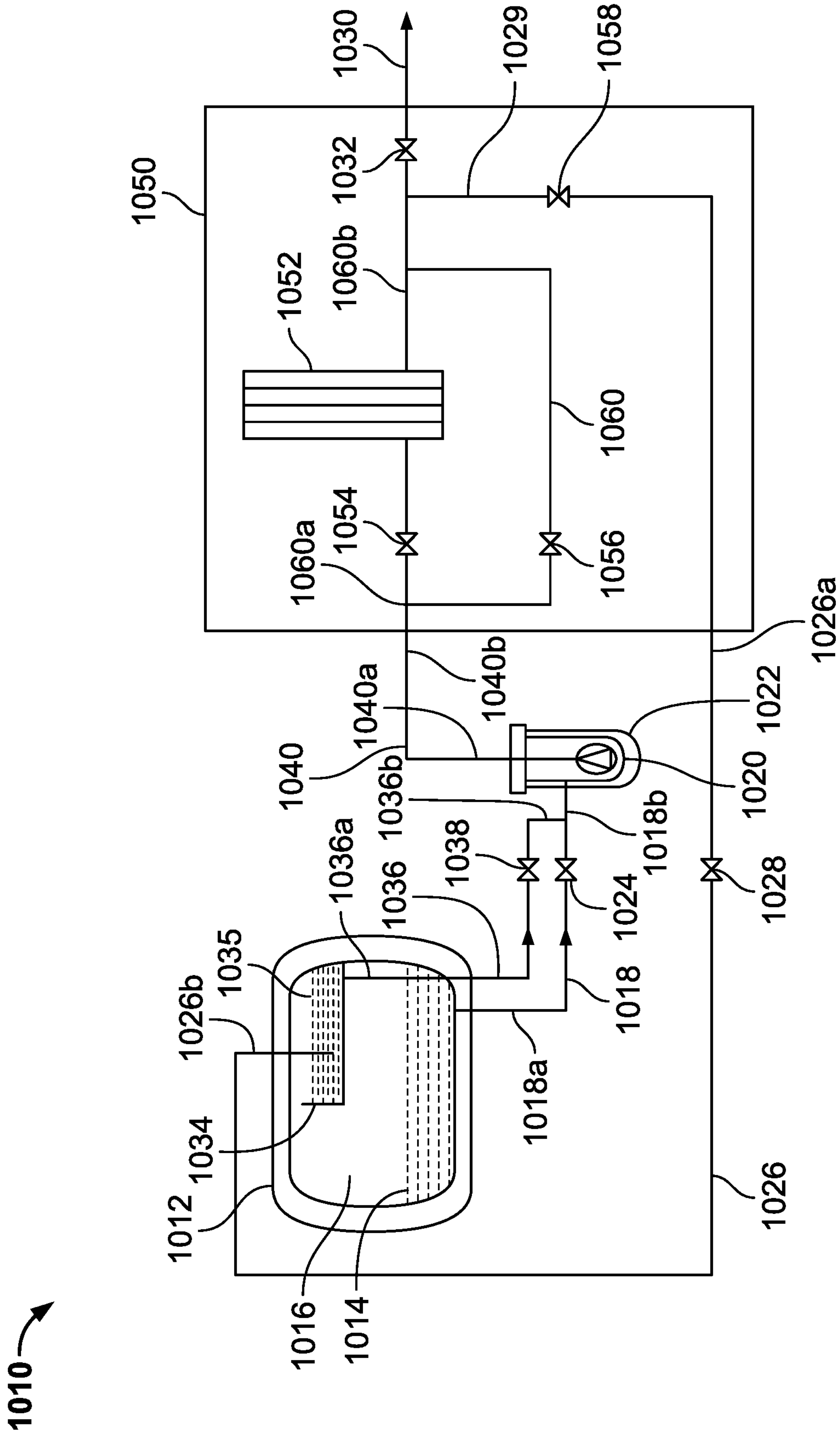
FIG. 1 is a schematic view of a first embodiment of a cryogenic fluid dispensing system in accordance with the disclosure.

A first embodiment of a cryogenic fluid dispensing system configured in accordance with the disclosure is indicated in general at 1010 in FIG. 1 and shown schematically as an LNG refueling station. The cryogenic liquid dispensing system 1010 includes a tank 1012 defining an area that holds cryogenic liquid 1014 with a vapor headspace 1016 above the cryogenic liquid 1014. A first supply conduit or line 1018 is in liquid communication via a first end 1018*a* with a bottom portion of the tank 1012 and is in liquid communication at a second end 1018*b* with a pump 1020 that is submerged in a separate vessel or sump 1022. Liquid from tank 1012 flows to sump 1022 so as to be in liquid communication with the inlet of the pump 1020 and to submerge the pump 1020 in liquid to maintain adequate cooling of the pump 1020. A first supply valve 1024 is located in the first supply line 1018 between the first end 1018*a* of the first supply line 1018 at the bottom portion of the tank 1012 and the second end 1018*b* of the first supply line 1018 at the pump 1020.

A basin 1034 defining an area configured to hold cryogenic liquid 1035 at a height raised above the bottom portion of the tank 1012 is provided, and the basin 1034 is in fluid communication with the interior of the tank 1012. The basin 1034 is suspended within the tank 1012 in an upper portion of the tank 1012, such as in the tank headspace, and has an upward facing opening.

A recycle conduit or line 1026 is in liquid communication at a first end 1026*a* with a conditioning system 1050 and is in liquid communication at a second end 1026*b* with the basin 1034. A recycle valve 1028 is located in the recycle line 1026 between the first end 1026*a* of the recycle line 1026 at the conditioning system 1050 and the second end 1026*b* at the basin 1034.

A dispensing conduit or line 1040 is in liquid communication with the pump 1020 at a first end 1040*a* and the conditioning system 1050 at a second location 1040*b*.

The conditioning system 1050 is connected to a product line 1030 for dispensing the cryogenic liquid to the use vehicle or other use device.

It will be appreciated that the conditioning system 1050 may be of any configuration known in the art for such systems. A particular non-limiting example is a saturation on the fly (SOF) system, such as the systems illustrated in U.S. Pat. No. 5,787,940 to Bonn et al. and U.S. Pat. No. 5,771,946 to Kooy et al., both of which are incorporated herein by reference. The conditioning system 1050 comprises at least a conditioning heat exchanger 1052 configured to warm cryogenic liquid and may include various additional line/conduit, sensor, controller and valve configurations that are not illustrated.

The example conditioning system 1050 includes a portion of dispensing line 1040 that is configured to direct cryogenic liquid to an inlet of the conditioning heat exchanger 1052. The conditioning system may also include a bypass line 1060 which has a bypass line inlet 1060*a* connected to the dispensing line and a bypass line outlet 1060*b*. There may also be a bypass valve arrangement configured to receive liquid from the pump and selectively direct received liquid through the conditioning heat exchanger, the bypass line inlet 1060*a*, or both the conditioning heat exchanger 1052 and the bypass inlet 1060*a*. The bypass valve arrangement includes at least one valve and may include two or more valves. The single valve may be located at the junction of the bypass line inlet and the dispensing line. Alternatively, as illustrated in FIG. 1, a pair of valves (1054, 1056) may be present on the dispensing line and the bypass line.

The conditioning system also may include a dispensing valve arrangement. The dispensing valve arrangement is in fluid communication with the conditioning heat exchanger outlet and the bypass line outlet 1060*b* and is configured to selectively direct received liquid through the recycle line 1026 or the product line 1030. The dispensing valve arrangement includes at least one valve and may include two or more valves. The single valve may be located at the junction 1029 of the product line and the recycle line inlet. Alternatively, as illustrated in FIG. 1, a pair of valves (1032, 1058) may be present on the product line and the recycle line.

A second supply conduit or line 1036 is in liquid communication at a first end 1036*a* with a bottom portion of the basin 1034 and is in liquid communication at a second end 1018*b* with a pump 1020. A second supply valve 1038 is located in the second supply line 1036 between a first end 1036*a* at the bottom portion of the basin 1034 and the second end 1036*b* at the pump 1020. One will appreciate that the first and second supply valves 1024 and 1038 optionally may be replaced with a three-way valve.

When dispensing of cryogenic liquid 1014 is not demanded, the pump 1020 is not operating and is maintained in a cold state by liquid in the sump 1022 with the first supply valve 1024 in an open position.

There are several processes that benefit from the modified layout of the dispensing system of the first embodiment. If pressure in the storage tank of the use vehicle is too high, the use vehicle can vent fluid to the tank 1012. This higher-pressure warmer fluid is vented through the product line 1030 to the recycle line 1026 and directed into the basin 1034. Also, before dispensing to the use vehicle, the system may need to be cooled down so that the cryogenic liquid parameters are suitable for the use vehicle. In order to accomplish the cool down of the system, the cryogenic liquid from the tank is circulated through the system. More specifically, the cold liquid is pulled from the bottom of the tank via the first supply line 1018 to the pump 1020. The cryogenic liquid is then pumped through the dispensing line 1040 to the conditioning system 1050 and the resulting warmed fluid is circulated through the recycle line 1026 to the basin 1034 of the tank 1012. Once the conditioning system reaches optimum cryogenic liquid parameters, cryogenic liquid can be dispensed to the use vehicle via product line 1030. Additionally, fluid in portions of the system following the conditioning system heat exchanger will be warmed and/or evaporated after dispensing the cryogenic liquid to the use vehicle. The liquid that has been warmed and/or evaporated is sent back to the basin 1034 via recycle line 1026. The liquid level in the basin 1034 should be maintained so as to be able to condense the vapor from the use vehicle and/or conditioning system and/or product line that travels back to the tank through the recycle line 1026.

Figure 2:
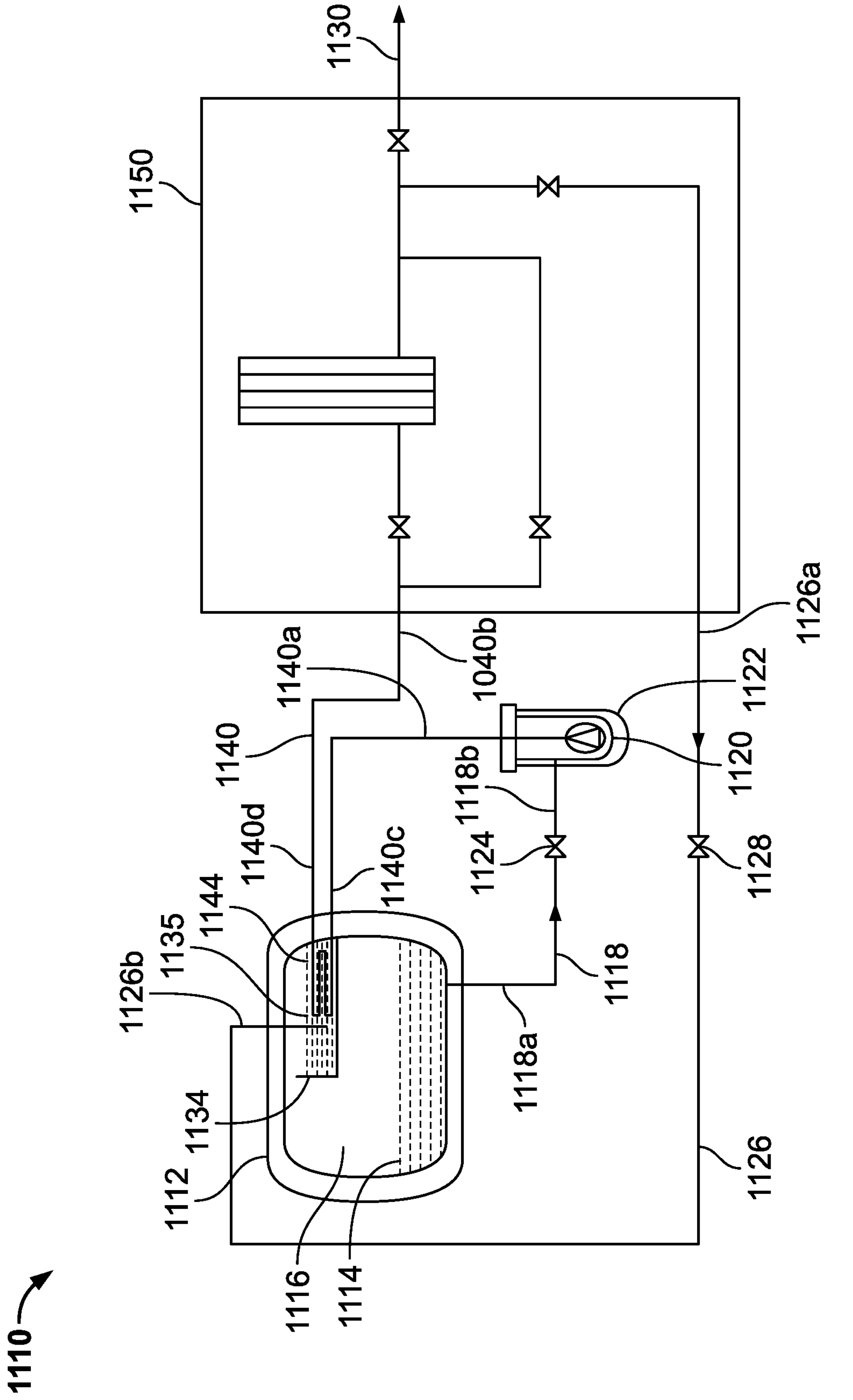
FIG. 2 is a schematic view of a second embodiment of a cryogenic fluid dispensing system in accordance with the disclosure.

A second embodiment of a cryogenic liquid dispensing system configured in accordance with the disclosure is indicated in general at 1110 in FIG. 2 and shown schematically as an LNG refueling station. The second embodiment is similar to and operates in the same general manner as the first embodiment, but the system 1110 includes a tank heat exchanger 1144 installed in the basin 1134 of the cryogenic tank to help manage heat in the system. The second embodiment does not incorporate a second supply line and utilizes a different path for the dispensing line.

The cryogenic liquid dispensing system 1110 includes a tank 1112 defining an area that holds cryogenic liquid 1114 with a vapor headspace 1116 above the cryogenic liquid 1114. A first supply conduit or line 1118 is in liquid communication via a first end 1118*a* with a bottom portion of the tank 1112 and is in liquid communication at a second end 1118*b* with a pump 1120 that is submerged in a separate vessel or sump 1122. Liquid from tank 1112 flows to sump 1122 so as to be in liquid communication with the inlet of the pump 1120 and to submerge the pump 1120 in liquid to maintain adequate cooling of the pump 1120. A first supply valve 1124 is located in the first supply line 1118 between the first end 1118*a* of the first supply line 1118 at the bottom portion of the tank 1112 and the second end 1118*b* of the first supply line 1118 at the pump 1120.

A basin 1134 defining an area configured to hold cryogenic liquid 1135 at a height raised above the bottom portion of the tank 1112 is provided and the basin 1134 is in liquid communication with the tank 1112. The basin 1134 is suspended within the tank 1112 in an upper portion or headspace of the tank 1112 and has an upward facing opening.

A dispensing conduit or line 1140 is in liquid communication with the pump 1120 and the conditioning system 1150. The dispensing line 1140 travels from a first end 1140*a* at the pump 1120 into the tank 1112 at location 1140*c* and exits the tank at location 1140*d* before heading to the conditioning system, including a conditioning heat exchanger, at location 1140*b*.

The portion of the dispensing line in the tank 1112 includes a tank heat exchanger 1144 positioned within the basin 1134. As shown in FIG. 2, the tank heat exchanger may be a multi-pass heat exchanger, but can also be any heat exchanger known in the art including, but not limited to, a single pass heat exchanger or a heat exchanger coil. In addition, the tank heat exchanger may be a separate component that receives liquid from and returns liquid to the dispensing line 1140.

A recycle conduit or line 1126 is in liquid communication at a first end 1126*a* with the conditioning system 1150, which includes a conditioning heat exchanger, and is in liquid communication at a second end 1126*b* with the basin 1134, to permit recirculation of the cryogenic liquid if desired. A recycle valve 1128 is located in the recycle line 1126 between the first end 1126*a* of the recycle line 1126 at the conditioning system 1150 and the second end 1126*b* at an upper position on the tank 1112.

As in the first embodiment of FIG. 1, the conditioning system 1150 is connected to a product line 1130 for dispensing the cryogenic liquid to the use vehicle and functions to adjust the temperature of the cryogenic liquid before dispensing. As with the conditioning system 1050 of FIG. 1, the conditioning system 1150 includes a conditioning heat exchanger 1152 for heating cryogenic liquid.

The system 1110 of the second embodiment may be operated in a similar manner to the system 1010 of the first embodiment, but the cryogenic liquid may instead be drawn from a single supply line from the bottom of the tank 1112, with any excess liquid from basin 1134, which has been cooled as explained below, overflowing into the liquid in the tank below. Alternatively, a second supply conduit or line (such as line 1036 in FIG. 1) may be provided between the bottom of the basin and the pump, and provided with a second supply valve (such as valve 1038 in FIG. 1). In addition, liquid traveling through the dispensing line passes back through the tank 1112 and tank heat exchanger 1144 within basin 1034 before traveling to the conditioning system.

When dispensing of the cryogenic liquid is demanded in the system of FIG. 2, the cryogenic liquid may be pumped through the pump and into the dispensing line. The cryogenic liquid flows through the dispensing line and is warmed in a heat exchanger in the top portion of the tank. As a result, the cryogenic liquid within the basin is cooled thus improving the ability of the basin liquid to condense the vapor from the vehicle tank and/or dispensing system that travels back to the station tank through the recycle line. The warmed cryogenic liquid passes to the conditioning system and through the conditioning heat exchanger of the conditioning system before being distributed through a product line to a use vehicle.

Figure 3:
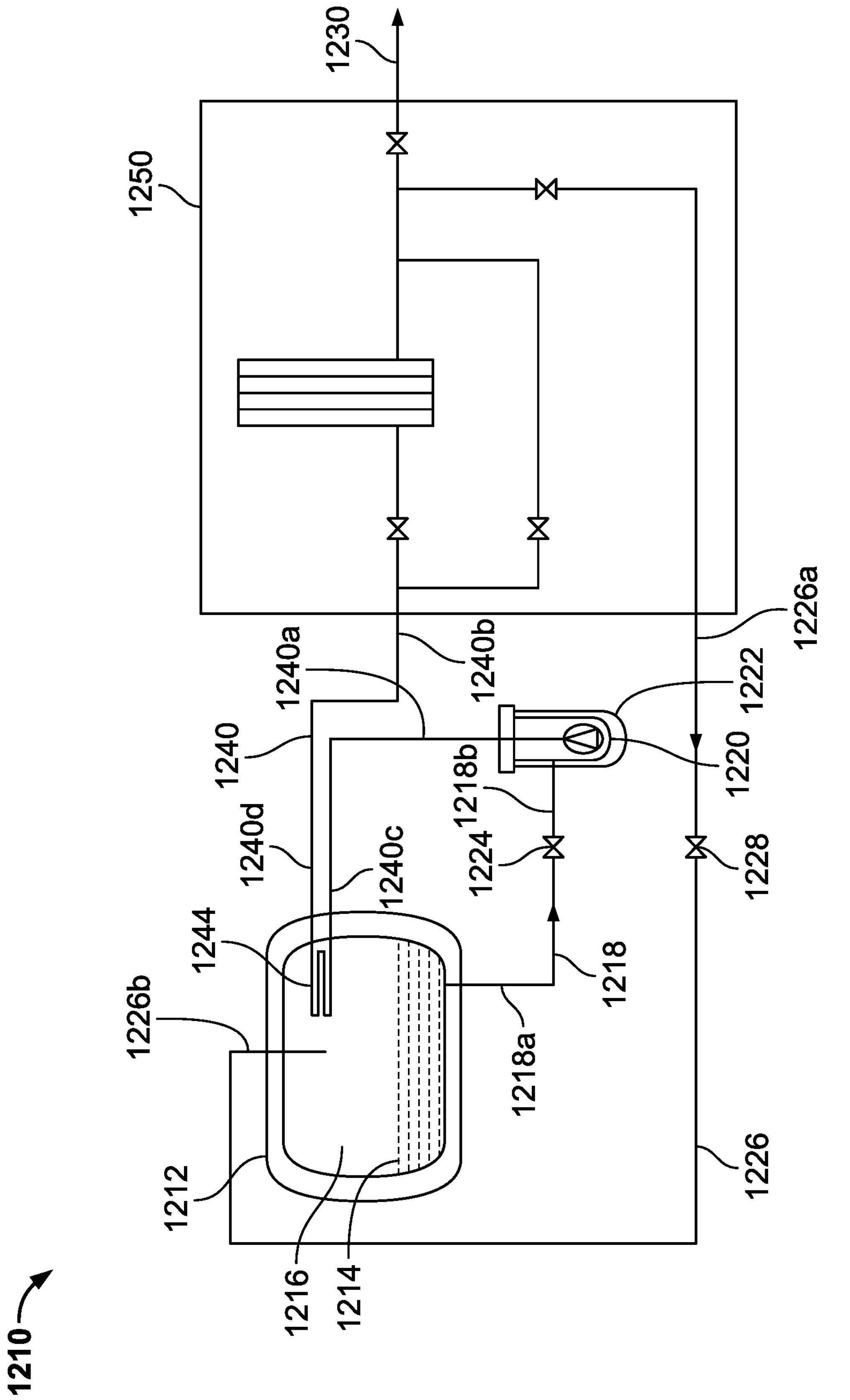
FIG. 3 is a schematic view of a third embodiment of a cryogenic fluid dispensing system in accordance with the disclosure.
Figure 4:
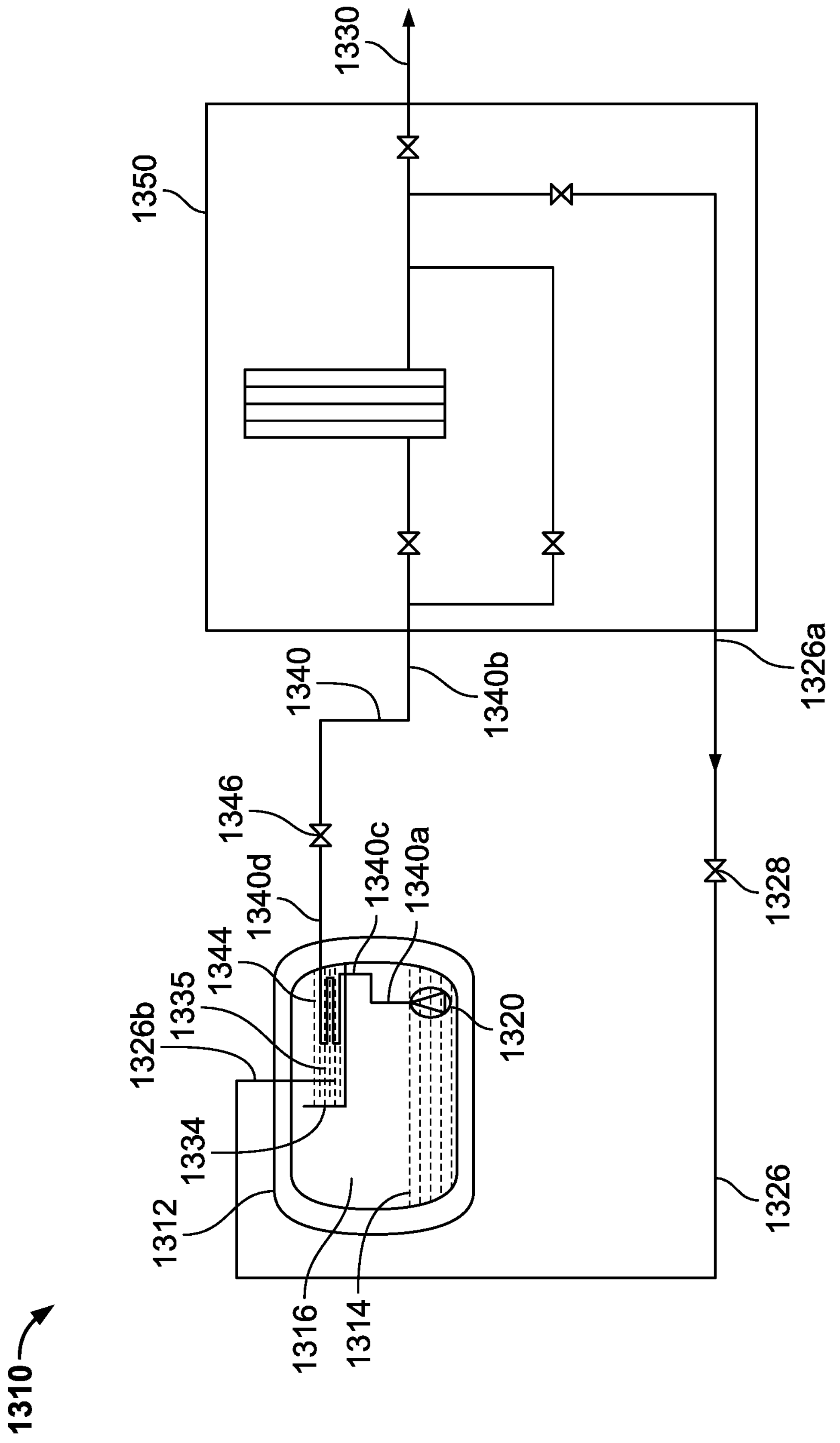
FIG. 4 is a schematic view of a fourth embodiment of a cryogenic fluid dispensing system in accordance with the disclosure.

FIGS. 3-4 illustrate variations of the system of FIG. 2. The systems in FIGS. 3-4 differ from the system of FIG. 2 with respect to the configurations of the tank, basin and dispensing line, but each still includes a tank heat exchanger on the dispensing line within the tank, as in the system shown in FIG. 2.

A third embodiment of a cryogenic liquid dispensing system configured in accordance with the disclosure is indicated in general at 1210 in FIG. 3 and shown schematically as an LNG refueling station. Assuming sufficient temperature stratification in the station bulk tank (to be expected in vertical tanks rather than in horizontal tanks), the basin of previous embodiments can be omitted, and heat exchanged between cold liquid in a heat exchanger and warm vapor in the tank headspace. The third embodiment therefore is similar to the second embodiment, but the system 1210 does not include a raised basin in the tank. Instead, the dispensing line passes through a tank heat exchanger 1244 positioned in the top portion or headspace of the tank 1212.

The cryogenic liquid dispensing system 1210 includes a tank 1212 defining an area that holds cryogenic liquid 1214 with a vapor headspace 1216 above the cryogenic liquid 1214. A first supply conduit or line 1218 is in liquid communication via a first end 1218*a* with a bottom portion of the tank 1212 and is in liquid communication at a second end 1218*b* with a pump 1220 that is submerged in a separate vessel or sump 1222. Liquid from tank 1212 flows to sump 1222 so as to be in liquid communication with the inlet of the pump 1220 and to submerge the pump 1220 in liquid to maintain adequate cooling of the pump 1220. A first supply valve 1224 is located in the first supply line 1218 between the first end 1218*a* of the first supply line 1218 at the bottom portion of the tank 1212 and the second end 1218*b* of the first supply line 1218 at the pump 1220.

The system 1210 may be operated in a similar manner to the system 1110 of FIG. 2, but the tank heat exchanger 1244 directly cools vapor located in the head space of the tank instead of liquid in a dedicated basin. Warmed vapor transfers heat through the heat exchanger 1244 to the cryogenic liquid therein, removing heat from the tank head space, and thus the dispensing system.

A dispensing conduit or line 1240 is in liquid communication with the pump 1220 and the conditioning system 1250, including a conditioning heat exchanger. The dispensing line 1240 travels from the pump 1220 into the tank 1212 at location 1240*c* and exits the tank at location 1240*d* before heading to the conditioning heat exchanger at location 1240*b*. The dispensing line runs through the top portion of the tank 1212. This portion of the dispensing line may include a heat exchanger 1244. As shown in FIG. 3, the heat exchanger may be a multi-pass heat exchanger, but can also be any heat exchanger known in the art.

A recycle conduit or line 1226 is in liquid communication at a first end 1226*a* with the conditioning system 1250, specifically a conditioning heat exchanger, and is in liquid communication at a second end 1226*b* with an upper portion of the tank 1212, to permit recirculation of the cryogenic liquid if desired. A recycle valve 1228 is located in the recycle line 1226 between the first end 1226*a* of the recycle line 1226 at the conditioning system 1250 and the second end 1226*b* at an upper position on the tank 1212.

As in the previous embodiments, the conditioning system 1250 is connected to a product line 1230 for dispensing the cryogenic liquid to the use vehicle.

A fourth embodiment of a cryogenic liquid dispensing system configured in accordance with the disclosure is indicated in general at 1310 in FIG. 4 and shown schematically as an LNG refueling station. The fourth embodiment of FIG. 4 is similar to the second embodiment of FIG. 2, but the system 1310 of FIG. 4 arranges the pump 1320 within the cryogenic tank 1312.

The system 1310 of the fourth embodiment may be operated in a similar manner to the system 1110 of the second embodiment, but the pump is located within the tank versus outside of the tank and in a sump. The pump is, therefore, cooled by the cryogenic liquid within the tank and does not require the sump of FIGS. 1-3 or other separate heat management.

The cryogenic liquid dispensing system 1310 includes a tank 1312 defining an area that holds cryogenic liquid 1314 with a vapor headspace 1316 above the cryogenic liquid 1314. Liquid from tank 1312 flows to the inlet of the pump 1320. The liquid from the tank 1312 is utilized as a cooling device for the pump 1320.

A basin 1334 defining an area configured to hold cryogenic liquid 1335 at a height raised above the bottom portion of the tank 1312 is provided and the basin 1134 is in fluid communication with the tank 1312. The basin 1334 is suspended within the tank 1312 in an upper portion or headspace of the tank 1312 and has an upward facing opening.

A dispensing conduit or line 1340 is in liquid communication with the pump 1320 and the conditioning system 1350 that includes a conditioning heat exchanger. The dispensing line 1340 travels from a first end 1340*a* at the pump 1320 inside the tank 1312 to the basin 1334 at location 1340*c* and exits the tank 1312 at location 1340*d*. A portion of the dispensing line in the tank 1312 is within the basin 1334. This portion of the dispensing line may include a tank heat exchanger 1344. As shown in FIG. 4, the heat exchanger may be a multi-pass heat exchanger, but can also be any heat exchanger known in the art.

A recycle conduit or line 1326 is in liquid communication at a first end 1326*a* with the conditioning system 1350, specifically a conditioning heat exchanger, and is in liquid communication at a second end 1326*b* with an upper portion of the tank 1312, to permit recirculation of the cryogenic liquid if desired. Preferably, the recycle line is in liquid communication with the basin 1334. A recycle valve 1328 is located in the recycle line 1326 between the first end 1326*a* of the recycle line 1326 at the conditioning system 1350 and the second end 1326*b* at an upper position on the tank 1312.

The conditioning system 1350 is connected to a product line 1330 for dispensing the cryogenic liquid to the use vehicle or other use device.

In summary, including a tank heat exchanger in the top portion of the cryogenic tank and routing cooling liquid via the dispensing line to the tank heat exchanger helps disperse heat to the pumped cryogenic liquid, such as LNG, for dispensing to use vehicles.

These solutions that provide better heat management in a tank could be applied to any horizontal tank for use in a cryogenic liquid dispensing system, but it also will be appreciated that the solutions may be applied to any vertical tank (a tank having a vertical cross-sectional area that is greater than its horizontal cross-sectional area) for use in a cryogenic fluid dispensing system.

The cross-sections of the pipes/conduits of the current disclosure can have various shapes, such as a circle, ellipsis, square, triangle, pentagon, hexagon, polygon, and other shapes.

The dispensing system, specifically the tank and pipe/conduits can be made from copper alloy, nickel alloy, carbon, stainless steel or any other known material in the art.

The dispensing systems disclosed above may include devices or gauges for reading different characteristics of the tank. These devices or gauges can show pressure, temperature, differential pressure, liquid level, etc.

The tanks of the dispensing systems above include at least one pipe for filling liquefied natural gas or withdrawing it from the tank. In one embodiment there is a separate fill pipe and a separate withdrawal pipe. There may be other paths out of the tank inner vessel to fill and remove the liquid as well. The fill and withdrawal pipes may be any suitable conduits for conveying or allowing the flow of fluid therethrough.

The valves disclosed in the above embodiments may be automatic valves. The valves disclosed in the above embodiments may optionally be one-way or check valves, allowing fluid to flow in one direction. The valves can have two openings, one for fluid to flow in and one for it to flow out of. As examples only, the valves can be, but are not limited to, ball check valves, tilting disk check valves, swing-check or stop-check valves. The valves can also be isolation valves, regulating the flow of fluid in a pipeline. The valves can function to start and stop the flow of liquid when desired. This function can be done by an open/closed setting. There are a number of different types of isolation valves that can be used. As examples only, the isolation valves may be, but are not limited to, globe valves, ball valves and gate valves.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A cryogenic fluid dispensing system comprising;

a tank defining a volume configured to hold cryogenic liquid;

a pump;

a conditioning heat exchanger configured to warm cryogenic liquid;

a dispensing line in liquid communication with the pump and the conditioning heat exchanger, the dispensing line passing through a top portion of the tank;

a basin positioned within the top portion of the tank and configured to hold cryogenic liquid at a height raised above a bottom portion of the tank, and being in fluid communication with the tank;

a tank heat exchanger located on the dispensing line and in the basin and configured to receive liquid from the pump and be submerged within cryogenic liquid held in the basin;

a product line configured to selectively receive warmed cryogenic liquid from an outlet of the conditioning heat exchanger and to direct liquid to a use device;

a recycle line configured to selectively direct fluid from the outlet of the conditioning heat exchanger to the basin and to selectively direct fluid from the product line to the basin; and a recycle valve in fluid communication with the recycle line.

2. The cryogenic fluid dispensing system of claim 1, further comprising:

a supply line in liquid communication with the bottom portion of the tank and the pump; and a supply valve located in the supply line between the bottom portion of the tank and the pump.

3. The cryogenic fluid dispensing system of claim 1 wherein the heat exchanger is a coil heat exchanger.

4. The cryogenic fluid dispensing system of claim 1, wherein the pump is located within the tank.

5. The cryogenic fluid dispensing system of claim 4 wherein the pump is in a lower portion of the tank.

6. The cryogenic fluid dispensing system of claim 1 further comprising:

a bypass line having a bypass line inlet connected to the dispensing line and a bypass line outlet;

a bypass valve arrangement configured to receive liquid from the pump and selectively direct received liquid through the conditioning heat exchanger, the bypass line inlet or both the conditioning heat exchanger and the bypass line inlet; and a dispensing valve arrangement in fluid communication with the conditioning heat exchanger outlet and the bypass line outlet and configured to selectively direct received liquid through the recycle line or the product line.

7. The cryogenic fluid dispensing system of claim 6, wherein the bypass valve arrangement includes at least two valves.

8. The cryogenic fluid dispensing system of claim 7, wherein at least one valve is located on the dispensing line and at least one valve is located on the bypass line.

9. The cryogenic fluid dispensing system of claim 6, wherein the bypass valve arrangement includes a single valve.

10. The cryogenic fluid dispensing system of claim 9, wherein the single valve is located at the junction of the bypass line inlet and the dispensing line.

11. The cryogenic fluid dispensing system of claim 6, wherein the dispensing valve arrangement includes at least two valves.

12. The cryogenic fluid dispensing system of claim 11, wherein at least one valve is located on the product line and at least one valve is located on the recycle line.

13. The cryogenic fluid dispensing system of claim 6, wherein the dispensing valve arrangement includes a single valve.

14. The cryogenic fluid dispensing system of claim 13, wherein the valve is located at the junction of the product line and the recycle line.

15. The cryogenic fluid dispensing system of claim 1, wherein the bulk storage tank is a horizontal tank.

* * * * *